(12) United States Patent
Simkine

(10) Patent No.: US 10,176,842 B2
(45) Date of Patent: Jan. 8, 2019

(54) METHOD FOR BACKING UP DIGITAL CINEMATOGRAPHIC CONTENT

(71) Applicant: Antoine Simkine, Paris (FR)

(72) Inventor: Antoine Simkine, Paris (FR)

(73) Assignee: ONO FILMS, Paris (FR)

( * ) Notice: Subject to any disclaimer, the term of this patent is extended or adjusted under 35 U.S.C. 154(b) by 98 days.

(21) Appl. No.: 14/371,553

(22) PCT Filed: Jan. 16, 2013

(86) PCT No.: PCT/IB2013/050398
§ 371 (c)(1),
(2) Date: Jul. 10, 2014

(87) PCT Pub. No.: WO2013/108190
PCT Pub. Date: Jul. 25, 2013

(65) Prior Publication Data
US 2014/0376890 A1    Dec. 25, 2014

(30) Foreign Application Priority Data

Jan. 18, 2012 (FR) ...................................... 12 50508

(51) Int. Cl.
*G11B 20/18* (2006.01)
*G03B 27/00* (2006.01)
(Continued)

(52) U.S. Cl.
CPC .......... *G11B 20/1803* (2013.01); *G03B 27/00* (2013.01); *G11B 20/00007* (2013.01);
(Continued)

(58) Field of Classification Search
CPC .......... G11B 20/1803; G11B 20/00007; G11B 20/10527; G03B 27/00; H04N 5/843; H04N 5/917
See application file for complete search history.

(56) References Cited

U.S. PATENT DOCUMENTS

2001/0014961 A1* 8/2001 Kaneda .............. G11B 20/1833
714/764
2002/0145614 A1* 10/2002 Van Valer ........... G06F 17/3028
345/629
(Continued)

FOREIGN PATENT DOCUMENTS

EP    1 158 519 A2    11/2001
EP    1 308 857 A2    5/2003
(Continued)

OTHER PUBLICATIONS

International Search Report issued in International Application No. PCT/IB2013/050398 dated May 23, 2013.
(Continued)

*Primary Examiner* — Hung Q Dang
*Assistant Examiner* — Sunghyoun Park
(74) *Attorney, Agent, or Firm* — Oliff PLC

(57) ABSTRACT

The present invention relates to a method for backing up digital cinematographic content, comprising the steps of: generating, from said content, a digital stream encoded in a compressed format, or having said digital stream already encoded in a compressed format; and recording said digital stream encoded in a compressed format onto a photographic film.

7 Claims, 1 Drawing Sheet

Figure 1:
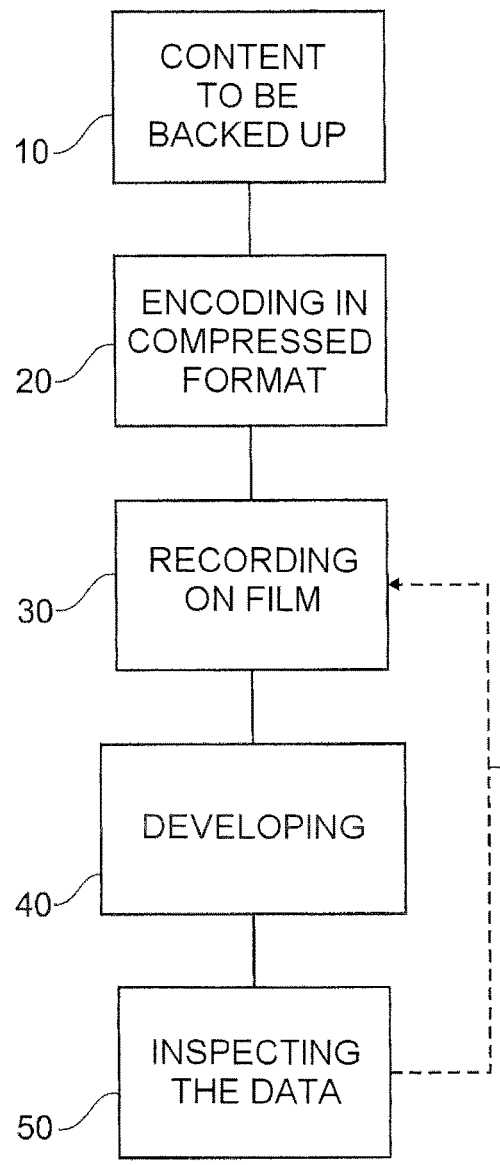

(51) Int. Cl.
*H04N 5/84* (2006.01)
*G11B 20/00* (2006.01)
*G11B 20/10* (2006.01)
*H04N 5/917* (2006.01)
*H04N 21/414* (2011.01)
*H04N 21/433* (2011.01)

(52) U.S. Cl.
CPC ....... *G11B 20/10527* (2013.01); *H04N 5/843* (2013.01); *H04N 5/917* (2013.01); *G11B 2020/00072* (2013.01); *H04N 21/41415* (2013.01); *H04N 21/4334* (2013.01)

(56) References Cited

U.S. PATENT DOCUMENTS

| | | | | |
|---|---|---|---|---|
| 2003/0233371 | A1* | 12/2003 | Abhyankar | G06F 17/30017 |
| 2005/0125454 | A1* | 6/2005 | Hung | H04N 1/00453 |
| 2005/0185959 | A1* | 8/2005 | Kinoshita | H04J 14/0227 398/59 |
| 2006/0045387 | A1 | 3/2006 | Quick et al. | |
| 2006/0059039 | A1* | 3/2006 | Patton | G06Q 30/02 705/14.37 |
| 2006/0093241 | A1* | 5/2006 | Nakamura | H04N 1/2166 382/306 |
| 2006/0158613 | A1* | 7/2006 | Fancher | G03B 31/02 352/26 |
| 2006/0250666 | A1* | 11/2006 | Wexler | G03D 15/001 358/487 |
| 2007/0097534 | A1* | 5/2007 | Evans | G11B 20/1201 360/31 |
| 2007/0269117 | A1* | 11/2007 | Ernvik | G06T 19/00 382/232 |
| 2008/0130425 | A1* | 6/2008 | Chevallier | G11B 7/003 369/1 |
| 2009/0210460 | A1* | 8/2009 | Ollivier | G03C 11/02 |
| 2010/0070548 | A1* | 3/2010 | Gashkov | G06F 7/724 708/232 |
| 2010/0295967 | A1* | 11/2010 | Zurbuchen | H04N 5/843 348/231.7 |
| 2011/0070548 | A1 | 3/2011 | Hosoya et al. | |

FOREIGN PATENT DOCUMENTS

| | | |
|---|---|---|
| GB | 684 351 | 12/1952 |
| GB | 2 428 130 A | 1/2007 |

OTHER PUBLICATIONS

Written Opinion of the International Searching Authority issued in International Application No. PCT/IB2013/050398 dated May 23, 2013.

* cited by examiner

METHOD FOR BACKING UP DIGITAL CINEMATOGRAPHIC CONTENT

The present invention relates to the archiving of digital cinematographic content.

Digital cinematographic content is rapidly expanding.

Film distribution practices have changed, hence the gradual disappearance of the photographic medium, including during shooting. Today, films are increasingly shot andor post-produced in digital format. The final basic element of the film thus becomes difficult to define and exhibits drawbacks.

It can be the standardized 2K version. In this version, the world that contains the RGB or DPX data is never perfectly known. There are also LUTs, look-up tables, involved in this digital version, wherein one is dependent on the broadcasting hardware, notably the projectors.

It can also be the DSM (Digital Source Master) version. The DSM is the digital master of a film; in the 35 mm world, it is equivalent to the original negative of the full-length film. The DSM is not subject to any constraint since the director of the film remains free to capture his or her images with the means he or she desires (35 mm camera, HD camera). It is then up to the digital laboratory to produce a DSM from the element supplied by the production at the end of shooting (35 mm copy, HD master) by scanning the images of this element if it was shot on film.

The basic element of the film can also be the uncompressed XYZ version resulting from the standardization (absolute value of the colorimetric data). This version comprises a good deal of useless data that will be cleared to make the compressed JPEG 2000 format.

There is also the back-to-film version. It is an interpretation of the standardized digital version, but the internegative cannot be used for more than 500 copies. Creating another one from the data is unpredictable, which is a drawback of this version. Even if it is the back-up version, it will be necessary to digitize it, restore it and attempt to return it to how it is meant to be, a state for which there is no reference. If a new transfer onto film is made several years later, there is no way of being certain what parameters make it possible to be faithful to the original, since the film and the developing baths are dependent on photochemistry, which varies considerably.

Another version is CMY. This is a three-color separation that is relatively faithful. Its durability (black and white film) is ensured for a long time. However, restoration is very expensive. Indeed, it requires 3 scans, recomposition, calibration, and there is no reference for what it is meant to be. Another drawback is that its fabrication and storage are also expensive.

The DCP (Digital Cinema Package) version is relatively independent of the broadcast media, and it is also in XYZ (absolute color value), and in JPEG 2000 format, therefore compressed. It is the equivalent in digital cinema of the projection copy, which in traditional (analog) cinema appears in the form of reels of 35 mm analog film.

A DCP is composed of a set of computer files (images, sounds, subtitles, metadata etc.) that are intended to be stored and played in the projection booth by a DCP reader coupled to a digital projector.

Long-term archiving requires that the data be preserved faithfully to their form and their content of origin, and that they be recoverable in the digital format in the future. Data recovery means must allow not only display on screen, printing, or any other system for outputting data, but also recovery of the source digital data.

There are binary storage media, particularly magnetic tape or disks and optical storage media. These media types do not guarantee the long-term reliability of the storage of the data by reason of their relatively short lifespan, as well as because of the hardware and the software that they require for accessing the data that are backed up on them. Any change in the processor or in the operating system can make the data that have been saved onto binary storage media unusable.

Patent application US 2006/0045387 discloses a method for preserving binary data on an analog archiving medium, which can be a microfilm. The binary data can be varied and can correspond to a video sequence.

Application EP 1 308 857 discloses a method for long-term preservation of data on a medium in a form that can be read by a person.

The study titled "Comparison of Methods and Costs of Digital Preservation", British Library Research and Innovation Report 106, describes the problem of backing up digital data and tends to consider the change of recording medium, notably the move toward back-up on microfilm, as an unadvisable solution due to the risk of losing useful data.

For big-budget films, the costs linked to the preservation of data in digital format by increasing the number of computer media and by ensuring their maintenance are negligible and the preservation can be ensured without difficulty.

On the other hand, for low-budget films or all other sources of cinematographic content, the problem of preservation is considerable.

As far as the Applicant is aware, there exists to date no durable back-up solution with a cost allowing it to be applied to the majority of digital cinematographic content.

Consequently, there exists an unsatisfied need to benefit from an effective and inexpensive system for backing up and archiving digital data.

The present invention aims to meet this need and manages to do so by means of a method for backing up digital cinematographic content, including the steps consisting in:
  if necessary, generating from said content to be backed up a digital stream encoded in a compressed format, or having said digital stream already encoded in a compressed format and
  recording this encoded digital stream in a compressed format onto a photographic film.

The invention offers a solution to the above problems by notably allowing the directors and producers to preserve their work in a durable manner and at a low cost without excessive loss of quality, by choosing a compressed format preserving enough data for a theater-quality projection.

The solution proposed by the invention thus offers a particularly satisfactory compromise between the drawback due to the loss of data that inevitably accompanies compression and the advantage linked to the way of backing up the compressed data.

Preferably, the compressed format preserves an absolute colorimetric information item, and notably makes it possible to retrieve, after archiving, the colorimetric coordinates in a reference colorimetric space, notably the XYZ space.

Preferably, compression is done in the JPEG 2000 format.

The data saved on the film can include cinematographic data but also, for example, instructions in the form of machine code.

The photographic film is preferably an analog 35 mm film. One of the major advantages of photographic film is its great stability over time: the medium is known and laboratory tests have demonstrated that it can be preserved, in favorable temperature and humidity conditions, for several hundreds of years.

The method according to the invention can include the reading of data recorded onto the film and their comparison with the data to be recorded. In this way it is possible to be assured of the faithfulness of the back-up from the moment the film is developed, which can, where applicable, make it possible to restart the operation for a sequence saved in a defective manner on film, for example by making a new save, onto the same film, of the sequence previously saved in a defective manner.

The method can include the recording of the data onto the film in a redundant manner, in order to increase the reliability of the back-up. In particular, the redundancy of the data can be such that the damaging of a few centimeters of film, for example up to 10 cm of film, does not harm the restoration of all the data of the content that is intended to be backed up. The method can include the recording of a corrective onto the film in the event of a data recording error being detected, in such a way as to facilitate the recovery of data having corrected the error.

The film is preferably developed in line, i.e. the data are imaged onto a new section of film while at the same time a section of previously imaged film is developed.

The data recorded on the film can be recorded in the form of pixels each encoding an item of information by gray levels.

The method can also include the steps consisting in:
allowing a user to issue a request for the recovery of digital data backed up on a photographic film by way of a user interface,
reading the photographic film and regenerating the digital data in a compressed format, which can be the same as that in which the data have been recorded onto the film, or a different format, and
transmitting these digital data to the user.

The invention makes it possible to back up not only a stream of digital images but also all the digital data relating to this stream. The digital data can include metadata, which can provide information on the backed-up digital data. These metadata notably allow indexing in a back-up database. The invention enables the backing up and recovery of these connected data as well.

The present invention makes it possible to back up the information on the colors associated with the digital data. This information can include encoding in absolute values according to the usual colorimetric standards in the field of cinema, in particular in the XYZ colorimetric space.

In a preferred exemplary embodiment, a Digital Cinema Package (DCP), the basic element of which includes the image data, is backed up on the photographic film As recalled above, a DCP includes encoded subtitles in an XML document, a soundtrack, images, metadata associated with the images representing the position of the latter on the sequence. The colors of the images can be encoded on 36 bits (each color on 12 bits). When each pixel is encoded on 12 bits, to back up a 4K version, i.e. of format 4000 by 3000 points, each digital image includes 12 million pixels. There is therefore a major benefit in compressing the images in a format making it possible to save both hardware and data space. The compression format is thus preferably the JPEG 2000 format. This format makes it possible to recover the images at sizes adapted to the power of the hardware used, while only taking up a small amount of back-up space.

The DCP can include an encryption key which can be backed up on a part separate from the other files composing the DCP on the photographic film. Thus, all the digital data required for the projection of a film can be backed up.

Figure 2:
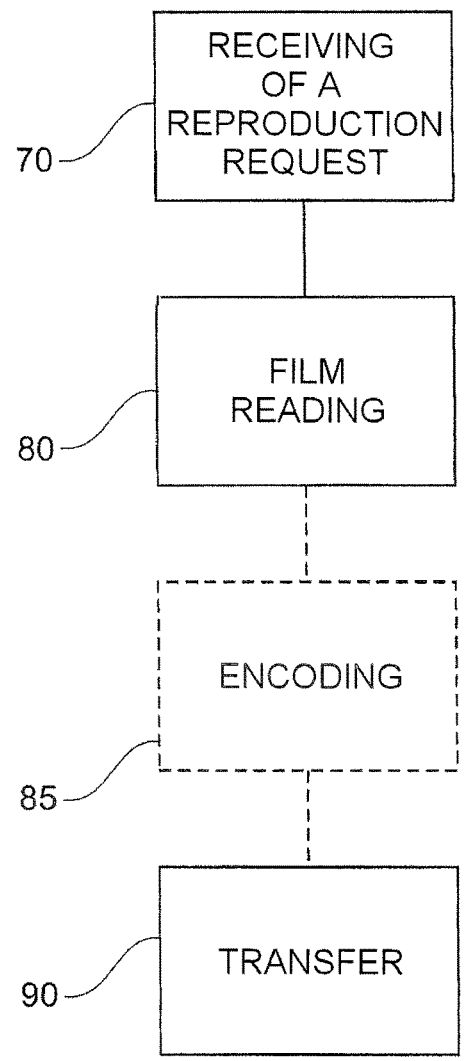

The present invention will be better understood upon reading the following detailed description, of a non-limiting exemplary embodiment of the latter, and upon examining the appended drawing, wherein:

FIG. 1 is a block diagram illustrating various steps of a method for archiving digital data according to the invention, FIG. 2 illustrates the steps of a method for recovering digital data archived according to the invention.

The archiving method according to the invention, some steps of which are illustrated in FIG. 1, comprises the fact of having source digital cinematographic data in a step 10. It is a 4K version, for example.

The method can include a step 20 of encoding these data in a compressed format, notably the JPEG 2000 format, as encountered in the DCP. In a variant, the data to be archived are supplied in an already compressed format.

The file format for the container of the images and audio is the MXF. There is one MXF container for containing the images, another for the audio. There can be other containers of MXF files, for example as many as there are audio tracks. The back-ups of metadata, sound, and images can be carried out at respectively separate places on the photographic film.

The compressed digital data are imaged in the next step 30 on an analog 35 mm film. The data are preferably encoded in the form of pixels encoding an item of information by their gray level, with one pixel encoding over $2^8$ gray levels, for example. An algorithm allows the digital data that are to be backed up to pass to the pixels to be imaged, in such a way as to allow the subsequent reproduction of the digital data.

For example, a scan is performed on the film as it scrolls, and each pixel is imaged with a gray level that encodes a binary information item. The reading is carried out with the same scan, in order to successively read the pixels and determine their gray level, which makes it possible to regenerate the digital information.

The film is developed in line in the step 40 and a reading can be carried out just after development, in line, in the step 50 to ensure the reliability of the save.

An inspection system makes it possible to check that the read imaged data do indeed match the source data. This system can include an in-line scanner at the output of the processor.

In the event of a recording error being detected, during the inspection, data marred with errors can be rerecorded onto the film in the step 60, and inspected again. Data signaling the presence of the corrective on the film can be recorded on the latter.

The photographic film is then stored by a storage device, for example in an air-conditioned warehouse.

FIG. 2 shows the steps of recovery of the source digital data. In the step 70, a request for recovery of data is carried out on an interface. Next, the film is recovered and read by a scanner, in the step 80, to regenerate the data encoded in the previous step 20. Where applicable, a new encoding in a different format is performed in the step 85.

The digital data are then transferred to a digital medium or over a network to the user having requested them, in the step 90.

The expression "including a" must be understood as being synonymous with "including at least one", unless the contrary is specified.

The invention claimed is:

1. A method for backing up digital cinematographic content including a stream of digital images and all the digital data relating to the stream of digital images, the method comprising:

generating a digital stream from the digital cinematographic content, the digital stream encoded in a compressed JPEG 2000 format, or having the digital stream already encoded in the compressed JPEG 2000 format, and recording the encoded digital stream onto a photographic film in a redundant manner and in the compressed JPEG 2000 format onto the photographic film, the redundancy of the digital data recorded on different sections of the same photographic film such that damaging more than one centimeter of the photographic film does not preclude restoration of all the data of the digital cinematographic content to be backed up.

2. The method as claimed in claim 1, the photographic film being an analog 35 mm film.

3. The method as claimed in claim 1, further comprising:
reading of data recorded onto the film; and
comparing the read data with the data to be recorded.

4. The method as claimed in claim 1, wherein the film is imaged and developed in line.

5. The method as claimed in claim 1, wherein the imaged data is encoded by gray levels of pixels onto the photographic film.

6. The method as claimed in claim 1, further comprising:
allowing a user to issue a request for the recovery of digital data backed up on the photographic film by way of a user interface,
reading the photographic film and regenerating the digital data in a compressed format, and
transmitting the digital data to the user.

7. The method as claimed in claim 1, further comprising:
upon detecting a data error in the digital stream recorded on the photographic film, recording a corrective onto the photographic film.

* * * * *